(12) United States Patent
Hanselka et al.

(10) Patent No.: US 8,150,053 B2
(45) Date of Patent: Apr. 3, 2012

(54) METHOD AND DEVICE FOR ELIMINATING VIBRATIONS OF A MECHANICAL STRUCTURE

(75) Inventors: Holger Hanselka, Darmstadt (DE); Tobias Melz, Darmstadt (DE); Dirk Mayer, Darmstadt (DE); Christoph Klein, Darmstadt (DE)

(73) Assignees: Fraunhofer-Gesellschaft zur Forderung der angewandten Forschung e.V., Munich (DE); Technische Universität Darmstadt, Darmstadt (DE)

( * ) Notice: Subject to any disclaimer, the term of this patent is extended or adjusted under 35 U.S.C. 154(b) by 958 days.

(21) Appl. No.: 11/914,282

(22) PCT Filed: May 12, 2006

(86) PCT No.: PCT/EP2006/004500
§ 371 (c)(1),
(2), (4) Date: Jun. 19, 2008

(87) PCT Pub. No.: WO2006/120014
PCT Pub. Date: Nov. 16, 2006

(65) Prior Publication Data
US 2009/0127975 A1    May 21, 2009

(30) Foreign Application Priority Data
May 12, 2005   (DE) .................. 10 2005 022 097

(51) Int. Cl.
*G10K 11/178*   (2006.01)
*G10K 11/175*   (2006.01)
*G10K 11/16*    (2006.01)

(52) U.S. Cl. ...... 381/71.1; 381/71.2; 310/319; 310/317; 310/318; 267/140.15

(58) Field of Classification Search ............... 381/71.1, 381/71.2; 310/319, 317, 318; 267/140.15, 267/140.11
See application file for complete search history.

(56) References Cited

U.S. PATENT DOCUMENTS

| | | | | |
|---|---|---|---|---|
| 3,754,152 A * | 8/1973 | Koehler et al. | ............... | 310/318 |
| 4,816,725 A * | 3/1989 | Hudimac | ............... | 318/114 |
| 5,032,753 A * | 7/1991 | Yamaguchi et al. | ............ | 310/317 |
| 5,270,607 A * | 12/1993 | Terajima | ............... | 310/316.01 |
| 5,315,203 A * | 5/1994 | Bicos | ............... | 310/326 |
| 5,347,870 A * | 9/1994 | Dosch et al. | ............... | 73/769 |
| 5,390,949 A * | 2/1995 | Naganathan et al. | ....... | 280/5.515 |
| 5,558,477 A * | 9/1996 | Browning et al. | ............ | 408/143 |
| 5,783,898 A * | 7/1998 | Wu | ............... | 310/316.01 |
| 5,838,092 A * | 11/1998 | Wang et al. | ............... | 310/326 |
| 5,857,694 A * | 1/1999 | Lazarus et al. | ............... | 280/602 |

(Continued)

FOREIGN PATENT DOCUMENTS

DE          199 30 055 A1       6/1999

(Continued)

*Primary Examiner* — Edgardo San Martin
(74) *Attorney, Agent, or Firm* — Antonelli, Terry, Stout & Kraus, LLP.

(57) ABSTRACT

The invention is a device and a method for eliminating vibrations of a mechanical structure with at least one electromechanical converter material that is actively connected to the mechanical structure and connected to an electrical circuit with at least one electrical impedance. The electrical circuit is connected to an interface, via which the at least one electrical impedance can be variably adjusted by wireless or wired communications with a control unit that is separated from the electrical circuit in which the electrical impedance features at least one variable ohmic resistor, inductive resistor or capacitor.

28 Claims, 1 Drawing Sheet

U.S. PATENT DOCUMENTS

| | | | |
|---|---|---|---|
| 6,191,519 B1* | 2/2001 | Nye et al. | 310/316.01 |
| 6,193,032 B1 | 2/2001 | Lesieutre et al. | |
| 6,299,410 B1* | 10/2001 | Hilbert et al. | 416/145 |
| 6,559,730 B1* | 5/2003 | Marvin et al. | 331/158 |
| 6,609,985 B2* | 8/2003 | Todd et al. | 474/109 |
| 6,742,632 B2* | 6/2004 | Treyde | 188/73.35 |
| 6,983,833 B2* | 1/2006 | Ivers et al. | 188/379 |
| 7,068,794 B2* | 6/2006 | Kim | 381/71.7 |
| 7,111,555 B2* | 9/2006 | Fehren et al. | 101/483 |
| 7,536,164 B2* | 5/2009 | Maligeorgos et al. | 455/318 |
| 7,637,359 B2* | 12/2009 | Melz et al. | 188/266.7 |
| 7,689,190 B2* | 3/2010 | Kerth et al. | 455/255 |
| 7,770,464 B2* | 8/2010 | Melz et al. | 73/811 |
| 7,876,024 B2* | 1/2011 | Melz et al. | 310/328 |
| 7,908,947 B2* | 3/2011 | Saeterbo et al. | 82/163 |
| 2007/0212939 A1* | 9/2007 | Melz et al. | 439/589 |
| 2010/0101906 A1* | 4/2010 | Herold et al. | 188/379 |

FOREIGN PATENT DOCUMENTS

| | | |
|---|---|---|
| DE | 100 51 784 C1 | 10/2000 |
| DE | 102 13 595 A1 | 3/2002 |

\* cited by examiner

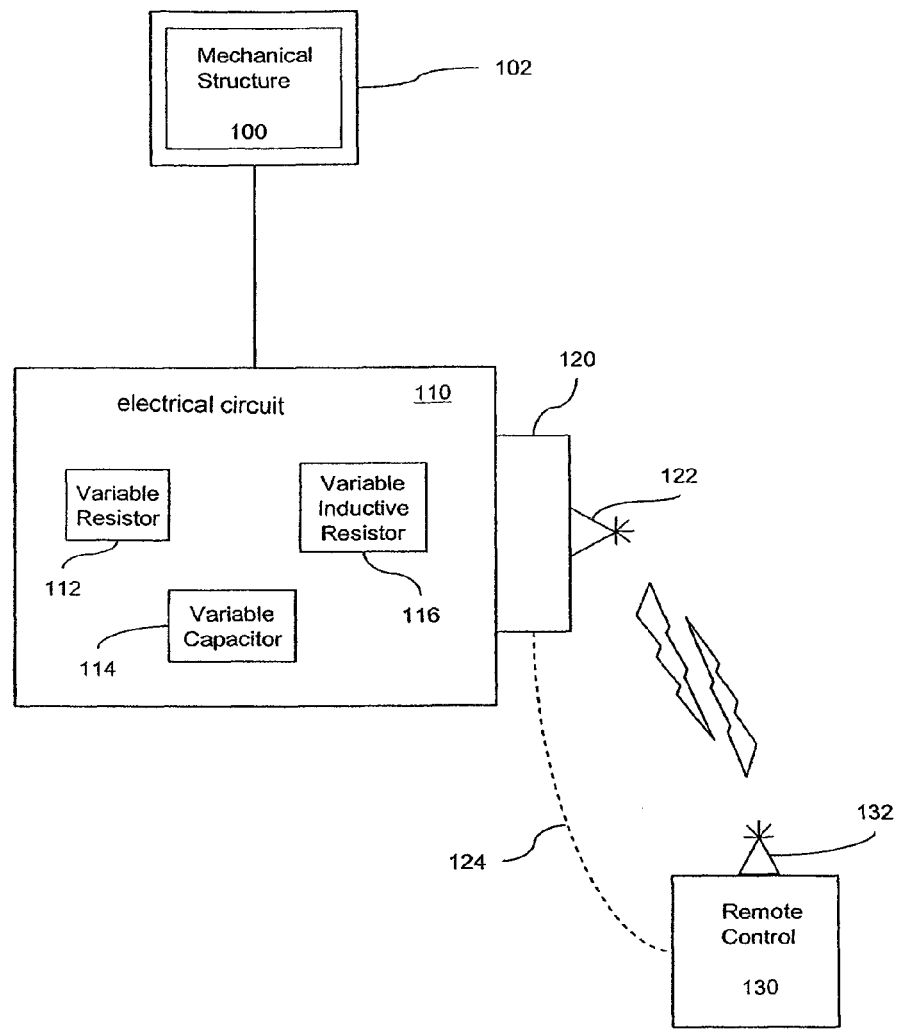

METHOD AND DEVICE FOR ELIMINATING VIBRATIONS OF A MECHANICAL STRUCTURE

BACKGROUND OF THE INVENTION

Technical Field

Field of the Invention

The invention pertains to a device and a method for eliminating vibrations of a mechanical structure with at least one electromechanical converter material that is actively connected to the mechanical structure and connected to an electric circuit arrangement with at least one electrical impedance.

STATE OF THE ART

Devices of this type for eliminating vibrations serve for purposefully damping certain states of vibration of a mechanical structure by withdrawing the vibration energy from the vibrating mechanical structure in a defined fashion. A number of publications, such as DE 40 37 786, DE 41 21 746 C2 and DE 199 57 744 C1, to name only a few, disclose damping systems, all of which feature a damping mass that is elastically coupled to the mechanical structure by means of a spring arrangement that usually consists of elastomer material and, in case of an excessive increase in resonant vibrations, withdraws vibration energy from the mechanical structure which is ultimately converted into heat due to the non-ideal spring.

In addition to mechanical variations of known damping systems, there also exist electromechanical damping systems that utilize the piezoelectric effect. In this case, a preferably flat piezoceramic foil element is applied to a mechanical structure that can be set in vibration or integrated therein. Naturally, it would also be possible to instead utilize multi-functional, preferably electromechanical converter materials that act similar to a piezoceramic material and basically are able to convert vibration energy in the form of deformations acting upon the respective converter material into electric energy by means of a corresponding inherent charge polarization of the material, wherein this electric energy is then converted into heat with an electrical impedance connected to the converter material. It would also be possible to utilize magnetostrictive materials for this purpose which are able to change their magnetic properties due to a shape change and, if suitable electrical wiring is provided, influence the electrical properties of the wiring in order to purposefully dampen the vibrating structure.

The electrical impedance may simply be an ohmic resistor, the resistance value of which can decisively influence the damping properties of the electromechanical damping system. If the electromechanical impedance connected to the electromechanical converter material also features an inductive resistor in addition to the ohmic resistor, an electrical resonant circuit is formed due to the capacitive properties of the piezoceramic converter material if corresponding wiring is provided, wherein this electrical resonant circuit makes it possible to significantly increase the energy conversion from vibration energy into electrical energy. Such an electromechanical damping system that is based on a semi-passive damping principle is described, for example, in an article by D. Mayer et al., "Synthetic Inductive Resistors for Semi-passive Damping", Tagungsband 5. Magdeburger Maschinenbautage, Sep. 19-20, 2001, pp. 63-72.

In electromechanical damping systems that can be realized to be much more compact than mechanical systems and also more reliable with respect to their function, an adaptation of the damping properties is achieved by changing the respective electronic component parameters. Such an adaptation is usually carried out prior to the implementation in the form of the electronic or electromechanical design of the electromechanical damping system.

One basic problem of mechanical as well as electromechanical damping systems can be seen in the frequency-specific design with respect to a certain resonant frequency of the mechanical structure to be dampened, at which the damping system should be effective, that is, the damping system is designed such that the damping point and the resonant frequency of the mechanical structure coincide. Known damping systems are typically designed for only one damping point or defined by the damping or designed for only a very narrow damping band. If the mechanical properties of the mechanical structure to be dampened change, that is, if the damping point and the resonant frequency of the structure to be dampened no longer coincide, the damping system loses its effectiveness. In particularly critical instances, it would even be conceivable that a frequency detuning between the damping point and the resonant frequency of the mechanical structure to be dampened causes the mechanical structure to vibrate with a changed resonant frequency, namely with vibration amplitudes that are significantly larger than those of a non-dampened mechanical structure. It would therefore be desirable to retune the damping properties as required, ideally in an automated fashion. Initial attempts to solve this problem resulted in so-called active or adaptive damping systems, in which the current state of vibration of a mechanical structure to be dampened is measured with sensors and at least one actuator provided on the mechanical structure is set in counter-vibration in dependence on the currently measured state of vibration such that the disturbing state of vibration of the mechanical structure can be actively counteracted.

DISCLOSURE OF THE INVENTION

The invention is a device for eliminating vibrations of a mechanical structure with at least one electromechanical converter material that is actively connected to the mechanical structure and connected to an electrical circuit arrangement with at least one electrical impedance, namely such that the damping properties of the mechanical converter material and of the circuit arrangement electrically connected thereto can be subsequently and individually adapted to changing resonance properties of the mechanical structure with the simplest and least expensive means possible. The measures to be taken should furthermore be implemented during the product development of mechanical structures in order to quickly and cost-efficiently detect and assist in preventing disturbing states of resonant vibration of mechanical structures.

BRIEF DESCRIPTION OF THE DRAWING

FIG. 1 is a block diagram illustrating an arrangement for eliminating vibrations in accordance with one embodiment of the present invention.

DETAILED DESCRIPTION OF THE INVENTION

Referring to FIG. 1, a device according to the invention for eliminating vibrations of a mechanical structure 100 provides an electrical circuit 110 connected to an interface 120, via which the at least one electrical impedance which can be variably adjusted by means of wireless or wired 124 communications with a remote control unit 130 that is separated from the electronic circuit 110. In this case, the electrical impedance features an interconnection of at least one ohmic resistor 112 and/or one inductive resistor 114 and/or one capacitor 116 into an electrical circuit 110, wherein the electrical parameters of the ohmic variable resistor 112, the variable inductive resistor 114 and the variable capacitor 116 are, preferably continuously variable. This makes it possible to produce a ready-made, fully resonant electrical circuit with individual oscillation properties and states of oscillation which preferably can be tuned online. That is, the electrical impedance is changed during the operation of the vibrating mechanical structure 100 without technical changes to the hardware.

A remote-controlled adaptation of the electronic component parameters of the electromechanical vibration damping device of the invention which defines the electrical impedance makes it possible, for example, to meteorologically determine the resonant frequencies of mechanical structures online and to carry out an electronic adaptation of the damping properties by means of wireless or wired remote control 130. The remote control 130 should be realized in a wireless fashion, in particular, on moving mechanical structures, for example, in the form of an infrared data transmission or radio transmission in which the Bluetooth protocol is utilized in order to avoid interfering connecting lines. The remote control 130 includes a transmitter-receiver unit 132. In this case, a corresponding transmission-reception unit 122 is provided at the location of the electromechanical damping system, wherein the transmission-reception unit 122 communicates with a remote control unit 130 that is separated from the damping system and able to transmit corresponding electronic adaptation commands. However, with damping stationary mechanical structures adaptation of the electrical impedance can be realized in a wired fashion. It is preferred to merely provide a suitable interface, into which a connecting line 124 leading to the remote control unit 130 can be plugged, at the location of the electrical circuit 110 that is connected to the electromechanical converter material 102.

It is generally known that piezoceramic or electrostrictively acting ceramic materials, as well as magnetostrictive alloys, are suitable electromagnetic converter materials 102. Depending on the design of the mechanical structure 100 to be dampened, the electromechanical converter material 102 needs to be fiber, wire, patch or foil forms and either applied to the structure or integrated into the mechanical structure 100. It is possible to utilize stacks of converter material 102, referred to as piezostacks, or composite materials of converter material 102 and other materials. In all instances, it is important to connect the electromechanical converter material 102 to the electrical circuit 110, in which at least one ohmic resistor 112, one inductive resistor 114 and/or one capacitor 116 are provided, preferably such that they form an electrical resonant circuit. At least one, but preferably all of the components provided in the electrical circuit 110, have variable component parameters such that an overall electrical impedance of the electric circuit 110 has changeable resonance properties. For example, a variable adjustment of the ohmic resistor 112 makes it possible to adjust the damping behavior of the circuit such that the amount of vibration energy withdrawn from the vibrating mechanical structure 100 is simultaneously determined. Analogous to a mechanical spring-mass vibration system, the size of the mass is defined by the selection of the inductive resistor 114 and, in accordance with the aforementioned mechanical analogy, the stiffness or the hardness of the spring is defined by the selection of the capacitor 116.

The inventive remote-controllable adjustment of the electrical component parameters of the electrical circuit 110 which define the damping properties therefore makes it possible to provide a wired-up electromechanical converter in standardized form for application to a mechanical structure 100. The mechanical structure can only be measured by means of the electromechanical damping system while it is in use, wherein the damping system can be individually adjusted to the current vibration behavior of the mechanical structure 100.

With respect to such remote-controllable damping systems, one particular advantage is the implementation in the development process of mechanical structures 100, during which numerous changes are usually carried out in order to optimize the structural properties. The optimal damping parameters, in this case the electrical damping parameters, which are ultimately used as fixed invariable circuit parameters in a series-produced low-cost component of unchanged structure, can only be determined after the structural development is completed. The method of the invention for eliminating vibrations of mechanical structures utilizes an electrical impedance that can be adjusted by remote control which is connected to the electromechanical converter material 102. The converter material 102 is connected to the mechanical structure which provides a purposeful and economical component development under optimized vibration specifications. That is, the determined and adjusted properties are realized with respect to the hardware technology in the form of fixed component parameters.

In addition to the development of components, another interesting application of the invention is the maintenance of mechanical structures that are subjected to vibrations which require the vibration behavior to be checked within maintenance intervals that are defined with respect to time or otherwise, such as, for example based on measurements. Corresponding corrections or even an exchange of the structures can be carried out where required, in response to changes in the vibration behavior being detected. Due to its small mass and compact structural shape when using microelectronic components without incoming and outgoing lines when using wireless signal transmission techniques, the remote-controllable vibration damping system according to the invention makes it possible to minimize influences that interfere with the vibration behavior of the structure such that an almost unadulterated investigation of the vibration behavior can be achieved.

The invention claimed is:

1. A device for removing vibration from a mechanical structure comprising:
  at least one electromechanical converter material actively connected to the mechanical structure and connected to an electrical circuit including at least one electrical impedance connected to a control;
  the electrical impedance including at least one variable ohmic resistor and at least one variable inductive resistor; and
  wireless or wired communications coupling the electrical circuit to the control for providing communications transmitted from the control to the at least one electrical impedance to adjust the impedance to remove vibration from the mechanical structure.

2. A device for removing vibration from a mechanical structure comprising:

at least one electromechanical converter material actively connected to the mechanical structure and connected to an electrical circuit including at least one electrical impedance connected to an interface and a control;

the electrical impedance including at least one variable ohmic resistor and at least one variable capacitor; and wireless or wired communications coupling the electrical circuit to the control for providing communications transmitted from the control to the at least one electrical impedance to adjust the impedance to remove vibration from the mechanical structure.

3. A device for removing vibration from a mechanical structure comprising:

at least one electromechanical converter material actively connected to the mechanical structure and connected to an electrical circuit including at least one electrical impedance connected to a control;

the electrical impedance including at least one variable ohmic resistor, at least one variable inductive resistor and at least one variable capacitor; and wireless or wired communications coupling the electrical circuit to the control for providing communications transmitted from the control to the at least one electrical impedance to adjust the impedance to remove vibration from the mechanical structure.

4. A method for removing vibration for a mechanical structure having at least one of adjustable stiffness, mass inertia and damping behaviors with a device including at least one electromechanical converter material actively connected to the mechanical structure and connected to an electrical circuit including at least one electrical impedance connected to a control, the electrical impedance including at least one variable ohmic resistor and at least one of a variable inductive resistor, and a variable capacitor and wireless or wired communications coupling the electrical circuit to the control for providing communications transmitted from the control to the at least one electrical impedance to adjust the impedance comprising:

removing electrical energy generated by deformation of the electromechanical converter material in a controlled fashion by adjusting a value of at least one of the variable ohmic resistor and a value of at least one of variable inductive resistor and the variable capacitor.

5. A method in accordance with claim 4 comprising:
using the device for developing the mechanical structure.
6. A method in accordance with claim 5 wherein:
the developing the mechanical structure utilizes optimized vibration specifications.
7. A method in accordance with claim 4 comprising:
using the device for maintaining the mechanical structure.
8. A method in accordance with claim 4 comprising:
using the device to check the vibration behavior of the mechanical structure and to provide a correction to the vibration behavior of the mechanical structure.
9. A device according to claim 1 wherein:
the wireless communications comprise radio or infrared transmission.
10. A device according to claim 2 wherein:
the wireless communications comprise radio or infrared transmission.
11. A device according to claim 3 wherein:
the wireless communications comprise radio or infrared transmission.
12. A device in accordance with claim 1 comprising:
an interface coupled to the electrical circuit and to the control including a plug and socket into which a connecting line to the control is insertable.
13. A device in accordance with claim 2 comprising:
an interface coupled to the electrical circuit and to the control including a plug and socket into which a connecting line to the control is insertable.
14. A device in accordance with claim 3 comprising:
an interface coupled to the electrical circuit and to the control including a plug and socket into which a connecting line to the control is insertable.
15. A device in accordance with claim 1 comprising:
an interface coupled to the electrical circuit and to the control comprising a transmission and reception unit; and wherein
the control comprises a transmission and reception unit.
16. A device in accordance with claim 2 comprising:
an interface comprising a transmission and reception unit coupled to the electrical circuit and to the control; and wherein
the control comprises a transmission and reception unit.
17. A device in accordance with claim 3 comprising:
an interface comprising a transmission and reception unit coupled to the electrical circuit and to the control; and wherein
the control comprises a transmission and reception unit.
18. A device in accordance with claim 1 wherein:
the electromechanical connector material comprises at least one of a piezoceramic, an electrostrictive ceramic or a magnetostrictive alloy.
19. A device in accordance with claim 2 wherein:
the electromechanical connector material comprises at least one of a piezoceramic, an electrostrictive ceramic or a magnetostrictive alloy.
20. A device in accordance with claim 3 wherein:
the electromechanical connector material comprises at least one of a piezoceramic, an electrostrictive ceramic or a magnetostrictive alloy.
21. A device in accordance with claim 1 wherein:
the electromechanical converter material comprises fiber, wire, a patch, foil, a stack of converter material or composites of converter material.
22. A device in accordance with claim 2 wherein:
the electromechanical converter material comprises fiber, wire, a patch, foil, a stack of converter material or composites of converter material.
23. A device in accordance with claim 3 wherein:
the electromechanical converter material comprises fiber, wire, a patch, foil, a stack of converter material or composites of converter material.
24. A device in accordance with claim 1 wherein:
the electromechanical converter material is applied to the mechanical structure or integrated therein.
25. A device in accordance with claim 2 wherein:
the electromechanical converter material is applied to the mechanical structure or integrated therein.
26. A device in accordance with claim 3 wherein:
the electromechanical converter material is applied to the mechanical structure or integrated therein.
27. A method in accordance with claim 4 wherein:
the wireless communications are radio or infrared transmissions.
28. A method in accordance with claim 9 wherein:
the radio transmissions use the Bluetooth protocol or a local area network.

* * * * *